(12) United States Patent
Ambikapathi et al.

(10) Patent No.: US 11,017,259 B2
(45) Date of Patent: May 25, 2021

(54) DEFECT INSPECTION METHOD, DEFECT INSPECTION DEVICE AND DEFECT INSPECTION SYSTEM

(71) Applicant: UTECHZONE CO., LTD., New Taipei (TW)

(72) Inventors: Arulmurugan Ambikapathi, New Taipei (TW); Ming-Tang Hsu, New Taipei (TW); Chia-Liang Lu, New Taipei (TW); Chih-Heng Fang, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 118 days.

(21) Appl. No.: 16/455,735

(22) Filed: Jun. 27, 2019

(65) Prior Publication Data
US 2020/0005070 A1    Jan. 2, 2020

(30) Foreign Application Priority Data
Jun. 29, 2018  (TW) .................................. 107122594

(51) Int. Cl.
  *G06T 7/13*       (2017.01)
  *G01N 21/892*     (2006.01)
  *G06K 9/46*       (2006.01)

(52) U.S. Cl.
  CPC ......... *G06K 9/4604* (2013.01); *G01N 21/892* (2013.01); *G06T 7/13* (2017.01); *G06T 2207/20084* (2013.01)

(58) Field of Classification Search
  None
  See application file for complete search history.

(56) References Cited

U.S. PATENT DOCUMENTS

| | | | |
|---|---|---|---|
| 2001/0055415 A1* | 12/2001 | Nozaki ................ | G01R 31/311 382/141 |
| 2006/0023937 A1* | 2/2006 | Tessadro .............. | G06K 9/4604 382/152 |
| 2019/0197356 A1* | 6/2019 | Kurita .................. | G06K 9/6256 |

* cited by examiner

*Primary Examiner* — Idowu O Osifade
(74) *Attorney, Agent, or Firm* — JCIPRNET

(57) ABSTRACT

An optical inspection method for an optical inspection device comprising an optical lens is provided according to an embodiment of the disclosure. The optical inspection method includes: obtaining a first image of an object by the optical lens; performing an edge detection on the first image to obtain a second image comprising an edge pattern; and performing a defect inspection operation on the second image based on a neural network architecture to inspect a defect pattern in the second image. In addition, an optical inspection device and an optical inspection system are provided according to embodiments of the disclosure.

12 Claims, 10 Drawing Sheets

… (1)

DEFECT INSPECTION METHOD, DEFECT INSPECTION DEVICE AND DEFECT INSPECTION SYSTEM

CROSS-REFERENCE TO RELATED APPLICATION

This application claims the priority benefit of Taiwan application serial no. 107122594, filed on Jun. 29, 2018. The entirety of the above-mentioned patent application is hereby incorporated by reference herein and made a part of this specification.

BACKGROUND

Technical Field

The disclosure relates to a defect pattern inspection technology, particularly to an optical inspection method, an optical inspection device and an optical inspection system.

Description of Related Art

Before an electronic component is sent out from the factory, the electronic component is usually inspected with visual confirmation by a human employee, so as to determine whether a defect is existed in the electronic component. Based on some improved technologies, Artificial Intelligence (AI) is gradually designed to support an ability of automatically inspecting defects to reduce the work loading of the human employee. However, automatic defect inspecting technology still has high error rate, such that double check with human employee is always required after the electronic component is inspected automatically.

SUMMARY

The disclosure provides an optical inspection method, an optical inspection device and an optical inspection system, which are capable of improving an inspection accuracy of the optical inspection device for inspecting a defect pattern.

An optical inspection method for an optical inspection device including an optical lens is provided according to an embodiment of the disclosure. The optical inspection method includes: obtaining a first image of an object by the optical lens; performing an edge detection on the first image to obtain a second image including an edge pattern; and performing a defect inspection operation on the second image based on a neural network architecture to inspect a defect pattern in the second image.

An optical inspection device which includes an optical lens and a processing circuit is provided according to an embodiment of the disclosure. The optical lens is configured to obtain a first image of an object. The processing circuit is coupled to the optical lens and configured to perform an edge detection on the first image to obtain a second image including an edge pattern. The processing circuit is further configured to perform a defect inspection operation on the second image based on a neural network architecture to inspect a defect pattern in the second image.

An optical inspection system which includes an optical inspection device and a server is provided according to an embodiment of the disclosure. The optical inspection device is configured to obtain a first image of an object and perform an edge detection on the first image to obtain a second image including an edge pattern. The server is coupled to the optical inspection device and configured to perform a defect inspection operation on the second image based on a neural network architecture to inspect a defect pattern in the second image.

On the basis above, after a first image of an object is obtained by an optical lens of an optical inspection device, an edge detection is performed on the first image to obtain a second image having an edge pattern. Then, a defect inspection operation is performed on the second image based on a neural network architecture to inspect a defect pattern in the second image. Therefore, an inspection accuracy of the optical inspection device for inspecting a defect pattern may be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
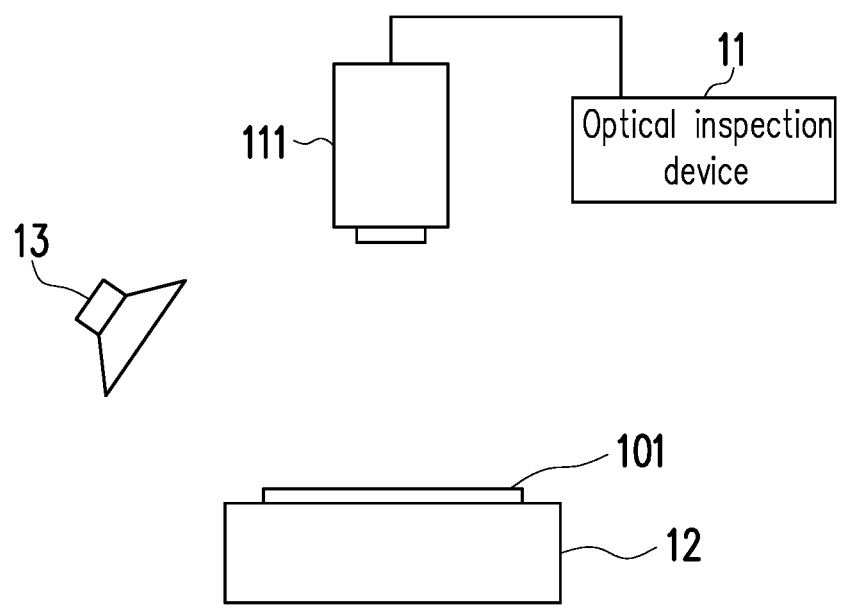
FIG. 1 is a schematic diagram of an optical inspection system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts. Furthermore, it is noted that the term "a" or "an" entity refers to one or more of that entity. As such, the terms "a" (or "an"), "one or more" and "at least one" can be used interchangeably herein.

Figure 2:
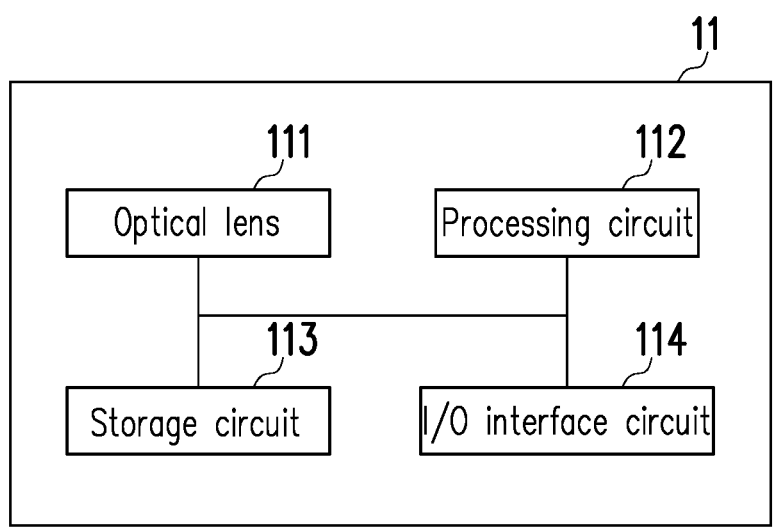
FIG. 2 is a schematic diagram of an optical inspection device according to an embodiment of the disclosure.

FIG. 1 is a schematic diagram of an optical inspection system according to an embodiment of the disclosure. FIG. 2 is a schematic diagram of an optical inspection device according to an embodiment of the disclosure. Referring to FIG. 1 and FIG. 2, an optical inspection system 10 may be applied to an automated optical inspection (AOI) equipment to perform a surface defect inspection on a workpiece, such as a semiconductor chip, a wafer, a panel, a circuit board (e.g., a printed circuit board (PCB), a flexible printed circuit (FPC), a ceramic PBC), and so on. In other words, the optical inspection system 10 is configured to inspect a defect on a surface of an object to be inspected.

The optical inspection system 10 includes an optical inspection device 11, a transfer device 12 and an auxiliary light source device 13. The optical inspection device 11 includes an optical lens 111. The optical lens 111 may include at least one of an area scan camera and line scan camera. The area scan camera is usually used for dynamical inspection and photographing the object 101 when object 101 is moving, so as to make sure the continuity of the inspection flow. The transfer device 12 is configured to achieve a fully automatic inspection. For example, the transfer device 12 may move the object 101 to an inspection area, and the object 101 is photographed by the optical lens 111 located in one side of the inspection area. As such, an image of the object 101 may be obtained by the optical lens and an image analysis may be performed on this image.

The auxiliary light source device 13 is configured to provide a light source for lighting the object 101. For example, the auxiliary light source device 13 may include a parallel light lamp, a diffuse light lamp, a dome shape lamp, and so on. The type of the auxiliary light source device 13 is not limited by the disclosure. For the object 101 with different types, the type of the auxiliary light source device 13 may be changed correspondingly. Furthermore, the auxiliary light source device 13 may emit one or more types of light, such as a white light, a red light, a green light, a blue light, an ultraviolet light, an infrared light, and so on. It is noted that, the numbers of the optical inspection device 11, the transfer device 12 and the auxiliary light source device 13 are not limited by the disclosure. In an embodiment, the optical inspection device 11 may transmit control signal to at least one of the optical lens 111, the transfer device 12 and the auxiliary light source device 13.

The optical inspection device 11 may analyze the image captured by the optical lens 111, so as to inspect a defect on the surface of the object 101 through this image. After the image is obtained by the optical lens 111, the optical inspection device 11 may perform a pre-process (e.g., performing an image enhancement, a noise filtering, a contrast enhancement, an edge enhancement, a feature obtaining, an image compression, an image transfer and so on) on the image, and the output image may be analyzed by a visual software tool and algorithm, so as to obtain a determination result and the determination result may be output or stored in database.

In an automatic optical inspection, a dust and a defect are usually confused by human inspection and by machine vision inspection (also referred to as automatic inspection) because the dust and the defect are both identified as the noise relative to the original image in machine vision. Although there are some differences between the dust and the defect (e.g., the dust is usually three-dimensional and prominent on the surface, while the defect such as a scratch, a broken point, or a light point is usually formed inside), both of the dust and the defect are the different parts from the original image for machine vision and difficult to be distinguished by general distinguishing logic. As such, in traditional, the defect is usually found out by machine and then double checked by manual inspection. However, in mass production, the amount of generated products may be counted as tens of thousands per hour, and manual inspection leads to lower efficiency and lower reliability then that of machine vision. Furthermore, the time for performing manual inspection is usually longer than that of machine vision. In an embodiment, the optical inspection device 11 may finish the entire inspection procedure, so as to reduce the human resource cost.

The optical inspection device 11 includes the optical lens 111, a processing circuit 112, a storage circuit 113 and input/output (I/O) interface circuit 114. The optical lens 111 includes at least one optical lens, and the type of the optical lens 111 is not limited by the disclosure. The processing circuit 112 may be a central processing unit (CPU), a graphic processing unit (GPU), micro-processor, digital signal processor (DSP), programmable controller, application specific integrated circuit (ASIC), programmable logic device (PLD) with common use or specific use, or other similar device, or combination of these devices. The processing circuit 112 may be in charge of the entire or part executions of the optical inspection device 11.

The storage circuit 113 includes a volatile storage medium and/or a non-volatile storage medium and is configured to storage data. For example, the volatile storage medium may be a random access memory (RAM), and the non-volatile storage medium may be a read only memory (ROM), a solid state disk (SSD), or a hard disk drive (HDD). The I/O interface circuit 114 may include signal output devices such as a display, a projector and a speaker, and/or signal input devices such as a mouse, a keyboard, a touch pad, a remote controller and a microphone. In an embodiment, the I/O interface circuit 114 may include signal input/output devices such as a touch screen and/or a network interface card.

After an image (also referred to as a first image) of the object 101 is obtained by the optical lens 111, the processing circuit 112 may perform an edge detection on the first image, so as to obtain another image (also referred to as a second image) having an edge pattern. For example, the edge detection may detect the edges of at least part of the patterns (also referred to as contours) in the first image (i.e., an original image) and present the detected edges in the second image in a form of edge patterns generated extra. For example, the processing circuit 112 may detect the points with obviously lightness change and serve these points as at least part of the edge patterns in the second image. The image analysis technology adopted by the processing circuit 112 for performing the edge detection is not limited by the disclosure. Furthermore, the processing circuit 112 may perform lighten process on the other image data not belonging to the edge pattern in the second image or remove these image data from the second image, so as to emphasis the edge pattern in the second image.

Generally, the patterns of the photographed electronic component is presented in the first image captured by the optical lens 111, but the edge pattern extra generated by the edge detection is not present in the first image. From another aspect, the processing circuit 112 may transfer the first image, captured by the optical lens 111, without the edge pattern to the second image having the edge pattern. In an embodiment, the accuracy for identifying a defect pattern by the processing circuit 112 may be improved by performing the edge detection. For example, comparing to directly performing the defect inspection on the first image, performing the defect inspection on the second image provides higher inspection accuracy.

Figure 3A:
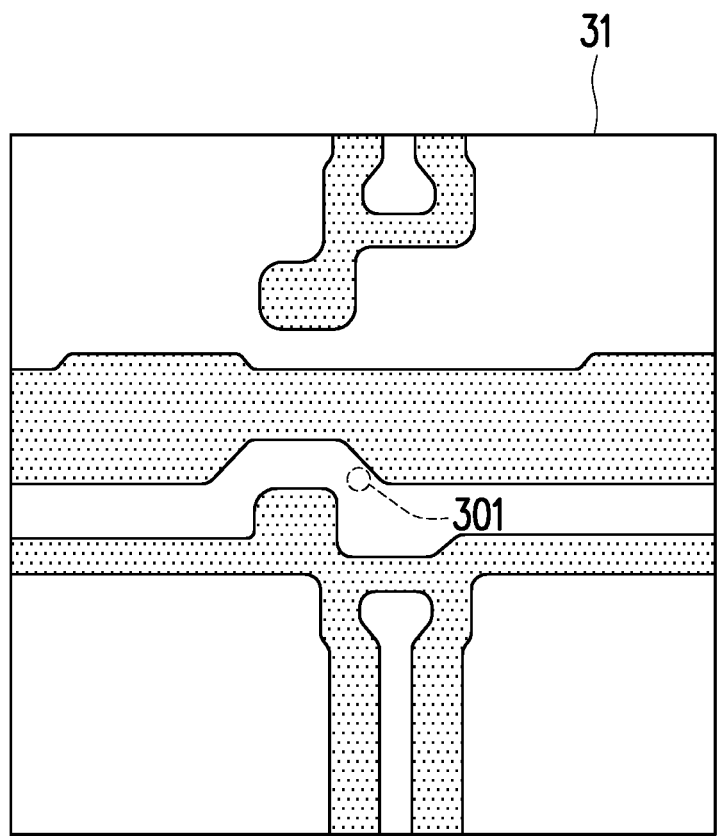
FIG. 3A is a schematic diagram of a first image according to an embodiment of the disclosure.
Figure 3B:
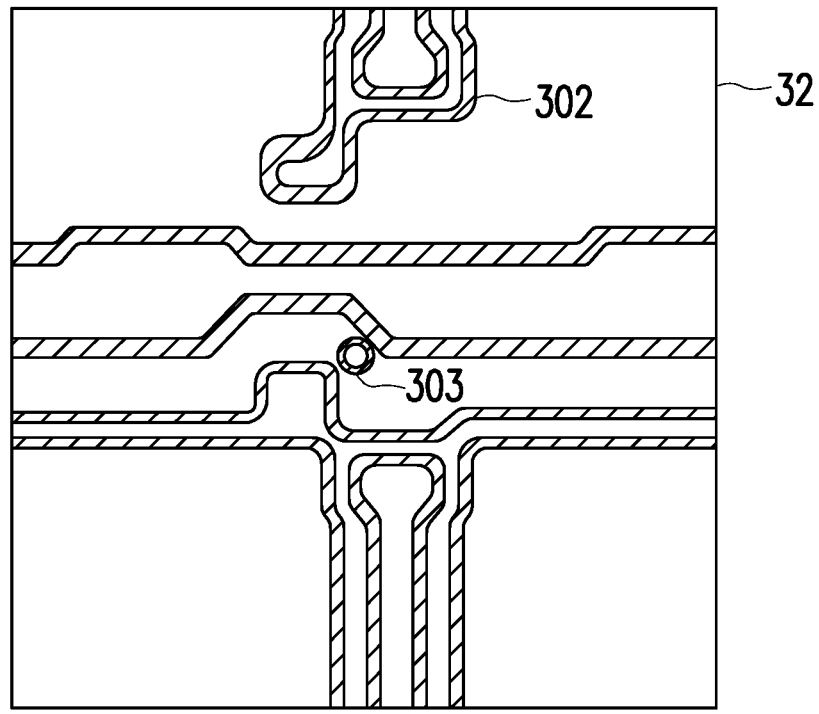
FIG. 3B is a schematic diagram of a second image according to an embodiment of the disclosure.

FIG. 3A is a schematic diagram of a first image according to an embodiment of the disclosure. FIG. 3B is a schematic diagram of a second image according to an embodiment of the disclosure. Referring to FIG. 3A and FIG. 3B, it is assumed that an image 31 is the first image and the image 31 includes unobvious defect 301. Based on the image 31, the defect 301 in the image 31 may not be easily identified by the manual inspection and/or by the automatic inspection. After the edge detection is performed on the image 31, an image 32 (i.e., the second image) may be generated. Comparing to the image 31, the image 32 includes an edge pattern 302 of the photographed electronic component and an edge pattern 303 (i.e., a defect pattern) of the defect 301. Comparing to the defect 301 in FIG. 3A, the edge pattern 303 of defect 301 in FIG. 3B is presented more obviously and more easily to be identified.

Referring back to FIG. 2, the processing circuit 112 may perform the edge detection on the first image based on a normal mode to obtain the second image having the edge pattern. For example, in the normal mode, the processing circuit 112 may perform the edge detection on the first image by using the original R value, the original G value and the original B value of each pixel in the first image.

In an embodiment, the processing circuit 112 may perform the edge detection on the first image based on at least one of a red model, a green model and a blue model of a RGB color model to obtain the second image having the edge pattern. For example, in the red model, the processing circuit 112 may keep the R value of each pixel in the first image and set the G value and the B value of each pixel in the first image to zero (or other value closing to zero) by using an image color adjustment technology and perform the edge detection on the adjusted first image. In the green model, the processing circuit 112 may keep the G value of each pixel in the first image and set the R value and the B value of each pixel in the first image to zero (or other value closing to zero) by using the image color adjustment technology and perform the edge detection on the adjusted first image. In the blue model, the processing circuit 112 may keep the B value of each pixel in the first image and set the R value and the G value of each pixel in the first image to zero (or other value closing to zero) by using the image color adjustment technology and perform the edge detection on the adjusted first image.

For some types of the defects, obvious edge pattern of a defect may not be generated by performing edge detection based on the normal mode mentioned above. However, if at least one of the red model, the green model and the blue model is adopted for performing the edge detection, it is possible to clearly show the edge pattern (i.e., the defect pattern) of the defect in the second image based on at least one of these models. As such, the accuracy for automatically inspecting defects may be improved.

After the second image is obtained, the processing circuit 112 may perform a defect inspection operation on the second image based on a neural network architecture to inspect the defect pattern in the second image. After a deep learning is executed, the accuracy for inspecting the defect pattern by the neural network architecture may be gradually improved. For example, by deep learning, the neural network architecture may automatically learn to find important feature information. The feature information may be applied to the inspection of the defect pattern in the second image. In other words, the trained neural network architecture may automatically inspect the defect pattern in the second image.

In an embodiment, the neural network architecture may be modified and expanded based on a LeNet model, an AlexNet model, a GoogleNet model or a VGG (Visual Geometry Group) model. The neural network architecture may automatically identify important feature information without manual identification. As such, the cost for training human employee may be reduced.

In an embodiment, the processing circuit 112 may obtain a sample image for training the neural network architecture. For example, the sample image may be comply with a standard specification of image inspection. Furthermore, the sample image does not include any defect. In other words, the sample image merely includes a normal image of an electronic component generated by actually photographing or by simulation.

The processing circuit 112 may generate at least one pair of a non-defect image and a defect image. A pair of the non-defect image and the defect image are also referred to as a set of pairing images. For example, the processing circuit 112 may perform the edge detection on the sample image to generate the non-defect image and the defect image. Furthermore, the processing circuit 112 may perform the edge detection on the sample image based on the normal mode, the red model, the green model, the blue model and so on, so as to generate the non-defect image and the defect image.

It is noted that, the defect image includes at least one defect pattern, and the non-defect image does not include any defect pattern. A set of pairing images corresponds to the same image region of the sample image. The processing circuit 112 may train the neural network architecture according to at least one set of pairing images, so as to improve the accuracy for inspecting the defect pattern by the neural network architecture.

In an embodiment, the processing circuit 112 may perform at least one of a chromaticity adjustment operation, a brightness adjustment operation and a pattern scaling operation on the sample image, so as to generate the non-defect image and the defect image. The chromaticity adjustment operation is configured to adjust the chromaticity (or saturation) of the sample image to generate the non-defect images and/or the defect images with different chromaticity. The brightness adjustment operation is configured to adjust the brightness of the sample image to generate the non-defect images and/or the defect images with different brightness. The pattern scaling operation is configured to adjust the size and/or scaling ratio of patterns in the sample image to generate the non-defect images and/or the defect images with different pattern sizes.

It is noted that, one set of pairing images has the same chromaticity, the same brightness and/or the same pattern size. Furthermore, the processing circuit 112 may randomly add the defect pattern into the selected image region of the sample image to generate the defect image.

Figure 4:
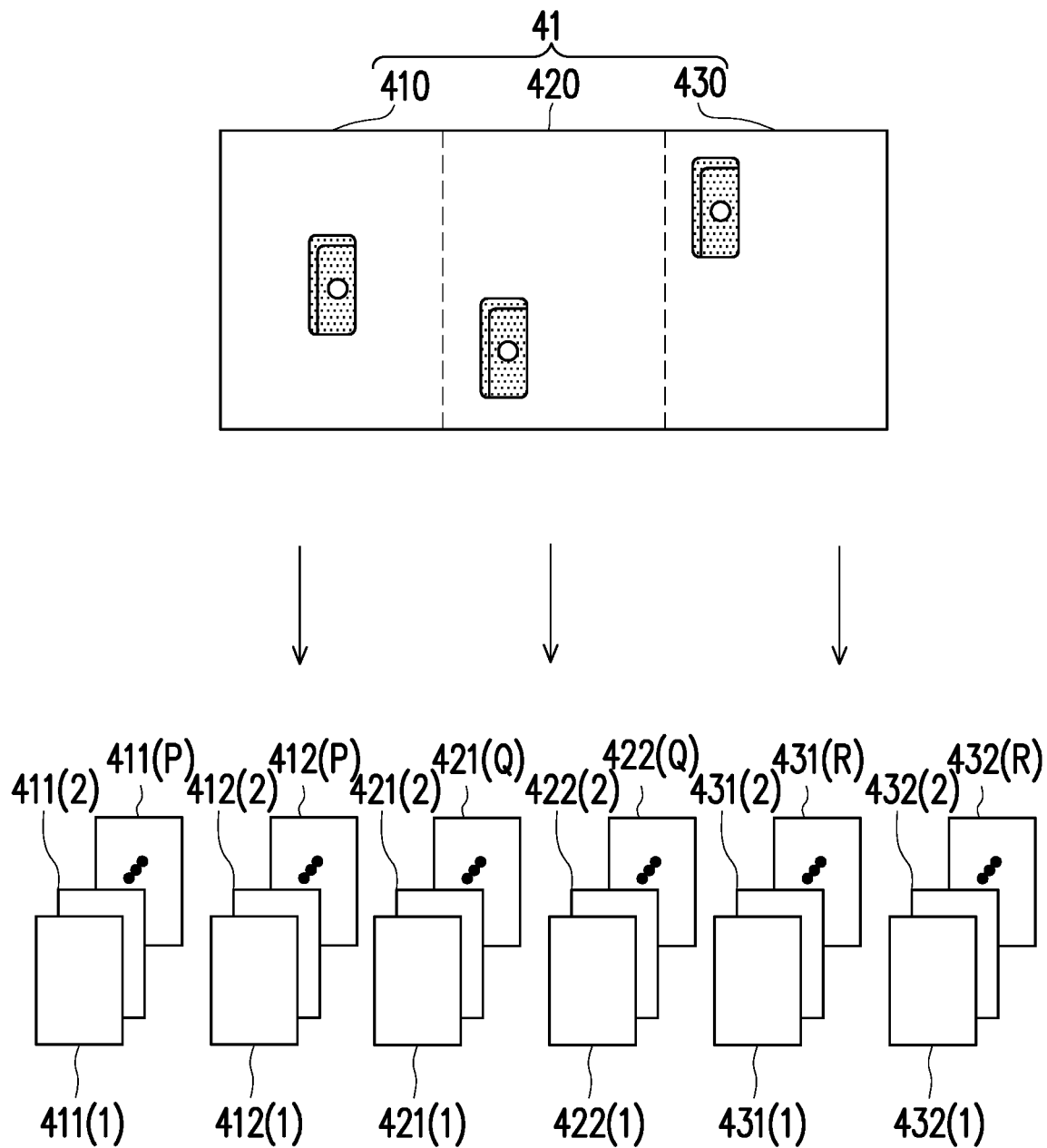
FIG. 4 is a schematic diagram of generating non-defect images and defect images according to the sample image according to an embodiment of the disclosure.

FIG. 4 is a schematic diagram of generating the non-defect images and the defect images according to the sample image according to an embodiment of the disclosure. Referring to FIG. 2 and FIG. 4, the sample image 41 includes image regions 410, 420 and 430. The sample image 41 does not have any defect. It is noted that, in another embodiment, more or less image regions may be divided from the sample image 41.

Defect images 411(1) to 411(P) and non-defect images 412(1) to 412(P) correspond to the image region 410. The defect image 411(A) and the non-defect image 412(A) are a set of pairing images, and A may be any integer between 1 and P. The processing circuit 112 may perform at least one of the chromaticity adjustment operation, the brightness adjustment operation and the pattern scaling operation on the image in the image region 410, so as to generate the defect images 411(1) to 411(P) and non-defect images 412(1) to 412(P). Furthermore, the processing circuit 112 may randomly add at least one defect pattern into the image region 410, so as to generate the defect images 411(1) to 411(P).

Defect images 421(1) to 421(Q) and non-defect images 422(1) to 422(Q) correspond to the image region 420. The defect image 421(B) and the non-defect image 422(B) are a set of pairing images, and B may be any integer between 1 and Q. The processing circuit 112 may perform at least one of the chromaticity adjustment operation, the brightness adjustment operation and the pattern scaling operation on the image in the image region 420, so as to generate the defect images 421(1) to 421(Q) and non-defect images 422(1) to 422(Q). Furthermore, the processing circuit 112 may randomly add at least one defect pattern into the image region 420, so as to generate the defect images 421(1) to 421(Q).

Defect images 431(1) to 431(R) and non-defect images 432(1) to 432(R) correspond to the image region 430. The defect image 431(C) and the non-defect image 432(C) are a set of pairing images, and C may be any integer between 1 and R. The processing circuit 112 may perform at least one of the chromaticity adjustment operation, the brightness adjustment operation and the pattern scaling operation on the image in the image region 430, so as to generate the defect images 431(1) to 431(R) and non-defect images 432(1) to 432(R). Furthermore, the processing circuit 112 may randomly add at least one defect pattern into the image region 430, so as to generate the defect images 431(1) to 431(R).

In an embodiment, multiple defect images (or non-defect images) corresponding to the same image region are generated based on performing at least one of the chromaticity adjustment operation, the brightness adjustment operation and the pattern scaling operation on this same image region. As such, multiple defect images (or non-defect images) corresponding to the same image region may have at least one difference of a chromaticity difference, a brightness difference and a pattern size difference from each other.

Taking FIG. 4 as an example, two defect images among the defect images 411(1) to 411(P) may have at least one difference of the chromaticity difference, the brightness difference and the pattern size difference from each other, and two non-defect images among the non-defect images 421(1) to 421(P) may have at least one difference of the chromaticity difference, the brightness difference and the pattern size difference from each other. For example, the defect image 411(1) may have a specific chromaticity (also referred to as a first chromaticity), the defect image 411(2) may have another chromaticity (also referred to as a second chromaticity). The value (also referred to as a first chromaticity value) of the first chromaticity is different from the value (also referred to as a second chromaticity value) of the second chromaticity. The difference between the first chromaticity and the second chromaticity (or the difference between the first chromaticity value and the second chromaticity value) may be referred to as the chromaticity difference as mentioned above.

Furthermore, multiple sets of pairing images may have at least one difference of the chromaticity difference, the brightness difference and the pattern size difference from each other. Taking FIG. 4 as an example, the defect image 411(1) and the non-defect image 412(1) may have a specific brightness (as referred to as a first brightness), and the defect image 411(2) and the non-defect image 412(2) may have another brightness (as referred to as a second brightness). The value (also referred to as a first brightness value) of the first brightness is different from the value (also referred to as a second brightness value) of the second brightness. The difference between the first brightness and the second brightness (or the difference between the first brightness value and the second brightness value) may be referred to as the brightness difference as mentioned above.

In an embodiment, the defect patterns in multiple defect images corresponding to the same image region are generated randomly. As such, the defect patterns in these defect images may be the same or be different. Taking FIG. 4 as an example, two defect images among the defect images 411(1) to 411(P) may have the same defect pattern or different defect patterns. It is noted that, said different defect patterns may be referred to as different defect patterns having different sizes, different shapes and/or defect patterns located in different location.

Figure 5:
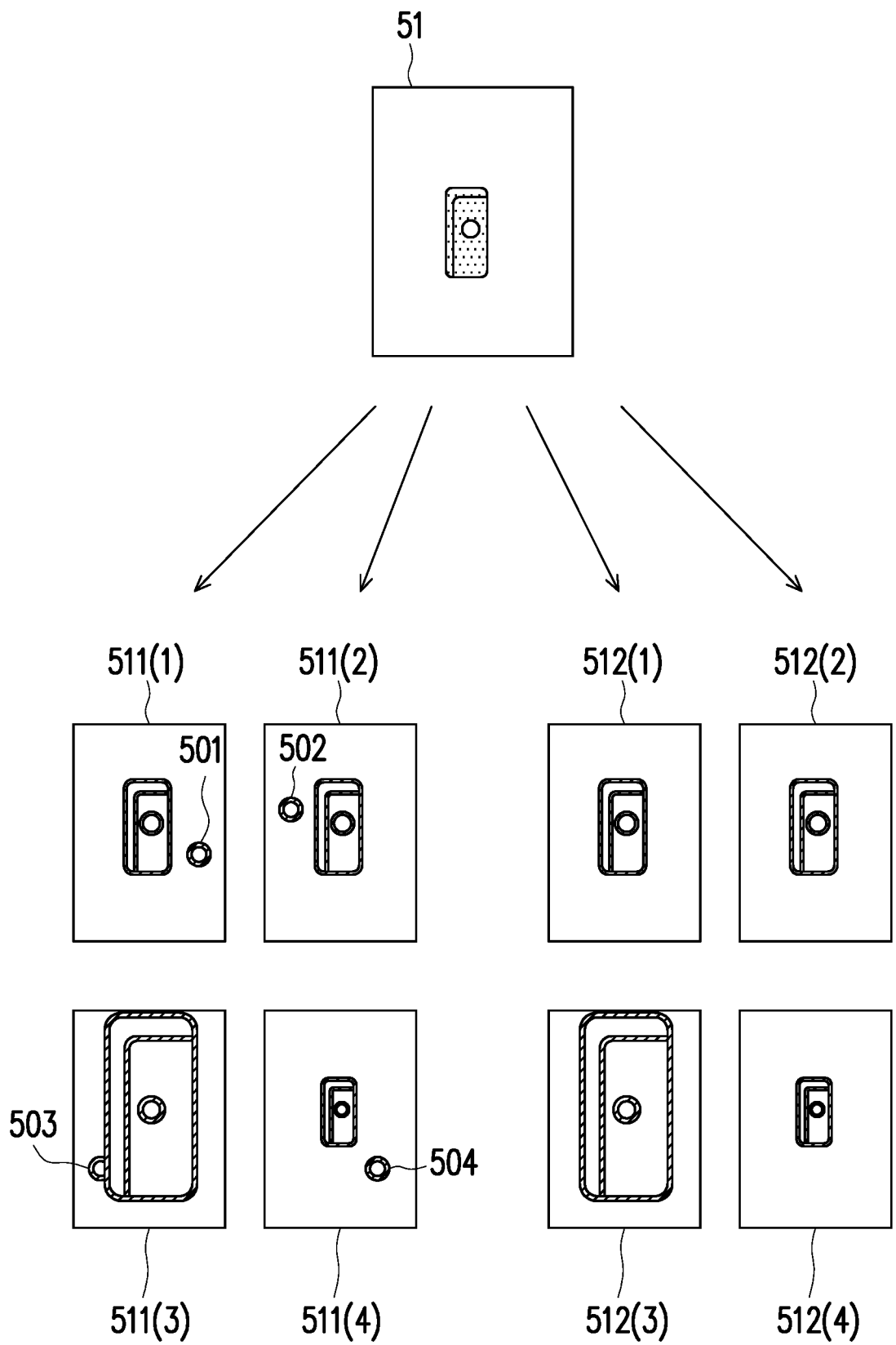
FIG. 5 is a schematic diagram of generating non-defect images and defect images according to the sample image according to an embodiment of the disclosure.

FIG. 5 is a schematic diagram of generating the non-defect images and the defect images according to the sample image according to an embodiment of the disclosure. Referring to FIG. 5, the defect images 511(1) to 511(4) and non-defect images 512(1) to 512(4) may be generated according to a sample image 51. The defect images 511(1) to 511(4) and non-defect images 512(1) to 512(4) correspond to the same image region of the sample image 51. The defect images 511(1) to 511(4) and non-defect images 512(1) to 512(4) may be used for training the neural network architecture.

Specifically, defect image 511(1) and non-defect image 512(1) are one set of pairing images, so the defect image 511(1) and the non-defect image 512(1) have the same chromaticity, the same brightness and the same pattern size. The defect image 511(1) has a defect pattern 501, and the non-defect image 512(1) does not have the defect pattern 501.

Defect image 511(2) and non-defect image 512(2) are one set of pairing images, so the defect image 511(2) and the non-defect image 512(2) have the same chromaticity, the same brightness and the same pattern size. The defect image 511(2) has a defect pattern 502, and the non-defect image 512(2) does not have the defect pattern 502.

Defect image 511(3) and non-defect image 512(3) are one set of pairing images, so the defect image 511(3) and the non-defect image 512(3) have the same chromaticity, the same brightness and the same pattern size. The defect image 511(3) has a defect pattern 503, and the non-defect image 512(3) does not have the defect pattern 503.

It is noted that, the pattern size of an electronic component in the defect image 511(3) and the non-defect image 512(3) is larger than the pattern size of the electronic component in the defect image 511(1) and the non-defect image 512(1), as shown in FIG. 5. For example, comparing to defect image 511(1) and the non-defect image 512(1), the defect image 511(3) and the non-defect image 512(3) may be generated by enlarging the sample image 51 based on larger pattern scaling ratio (e.g., double of original pattern size).

Defect image 511(4) and non-defect image 512(4) are one set of pairing images, so the defect image 511(4) and the non-defect image 512(4) have the same chromaticity, the same brightness and the same pattern size. The defect image 511(4) has a defect pattern 504, and the non-defect image 512(4) does not have the defect pattern 504.

It is noted that, the pattern size of the electronic component in the defect image 511(4) and the non-defect image 512(4) is smaller than the pattern size of the electronic component in the defect image 511(1) and the non-defect image 512(1), as shown in FIG. 5. For example, comparing to defect image 511(1) and the non-defect image 512(1), the defect image 511(4) and the non-defect image 512(4) may be generated by reducing the sample image 51 based on smaller pattern scaling ratio (e.g., half of original pattern size).

From another aspect, in one set of pairing images, the difference between the defect image and the non-defect image may (only) include the defect pattern generated on purpose. Other parameters (e.g., the chromaticity, the brightness and/or the pattern size) that may influence the identification result of the defect pattern are the same between the defect image and the non-defect image in one set of paring images.

Figure 6:
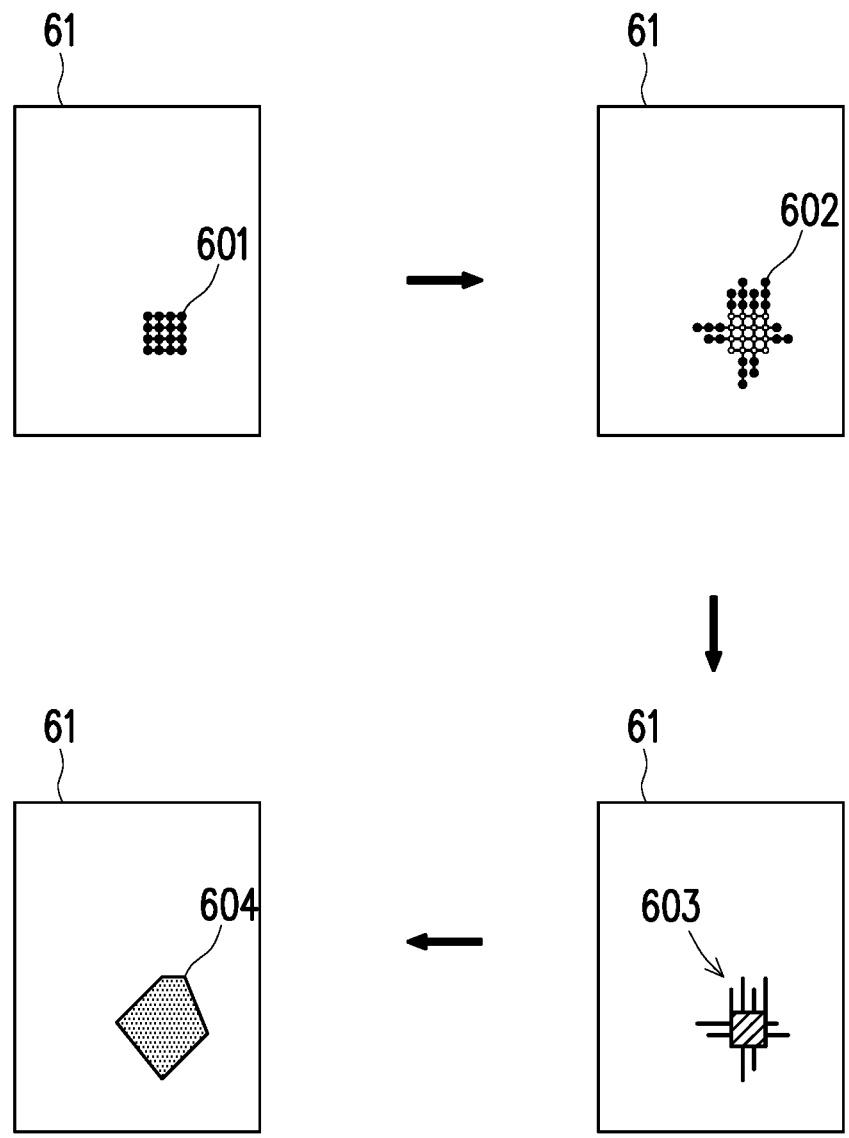
FIG. 6 is a schematic diagram of generating a defect pattern randomly according to an embodiment of the disclosure.

FIG. 6 is a schematic diagram of generating a defect pattern randomly according to an embodiment of the disclosure. Referring to FIG. 2 and FIG. 6, the processing circuit 112 may randomly select N pixels (also referred to as first pixels) 601 in an image region 61. N may be any positive integer. It is noted that, the operation of selecting the first pixels may be configured to determine a location of the generated defect pattern in the defect image.

After the first pixels 601 are selected, the processing circuit 112 may randomly select M pixels (also referred to as second pixels) 602 neighboring to the first pixels 601 in the image region 61. M may be any positive integer. It is noted that, the operation of selecting the second pixels may be configured to determine a rough size and/or a rough shape of the generated defect pattern. For example, the processing circuit 112 may extend a random length along a specific column or a specific row from at least one of the first pixels 601 as a center, and then select at least one pixel on the extended path as the second pixels 602.

The processing circuit 112 may generate the defect pattern according to the first pixels 601 and the second pixels 602. For example, the processing circuit 112 may add a pattern mask 603 at the location of the first pixels 601 and the second pixels 602. Then, the processing circuit 112 may perform a connection operation and a smooth operation on the terminals of the pattern mask 603, so as to form the defect pattern 604.

It is noted that, the embodiment of FIG. 6 is merely an example for generating the defect pattern. In another embodiment, the processing circuit 112 may generate a defect pattern by other technology means. For example, in an embodiment, the processing circuit 112 may randomly select a plurality of pixels from the image region 61 and directly add a mask on the selected pixels to form the defect pattern. Alternatively, in an embodiment, the storage circuit 113 may store at least one model of at least one defect pattern. The processing circuit 112 may randomly select a model of one defect pattern from the storage circuit 113, select corresponding pixels from the image region 61 according to the selected model, and add the mask to form the defect pattern.

Figure 7:
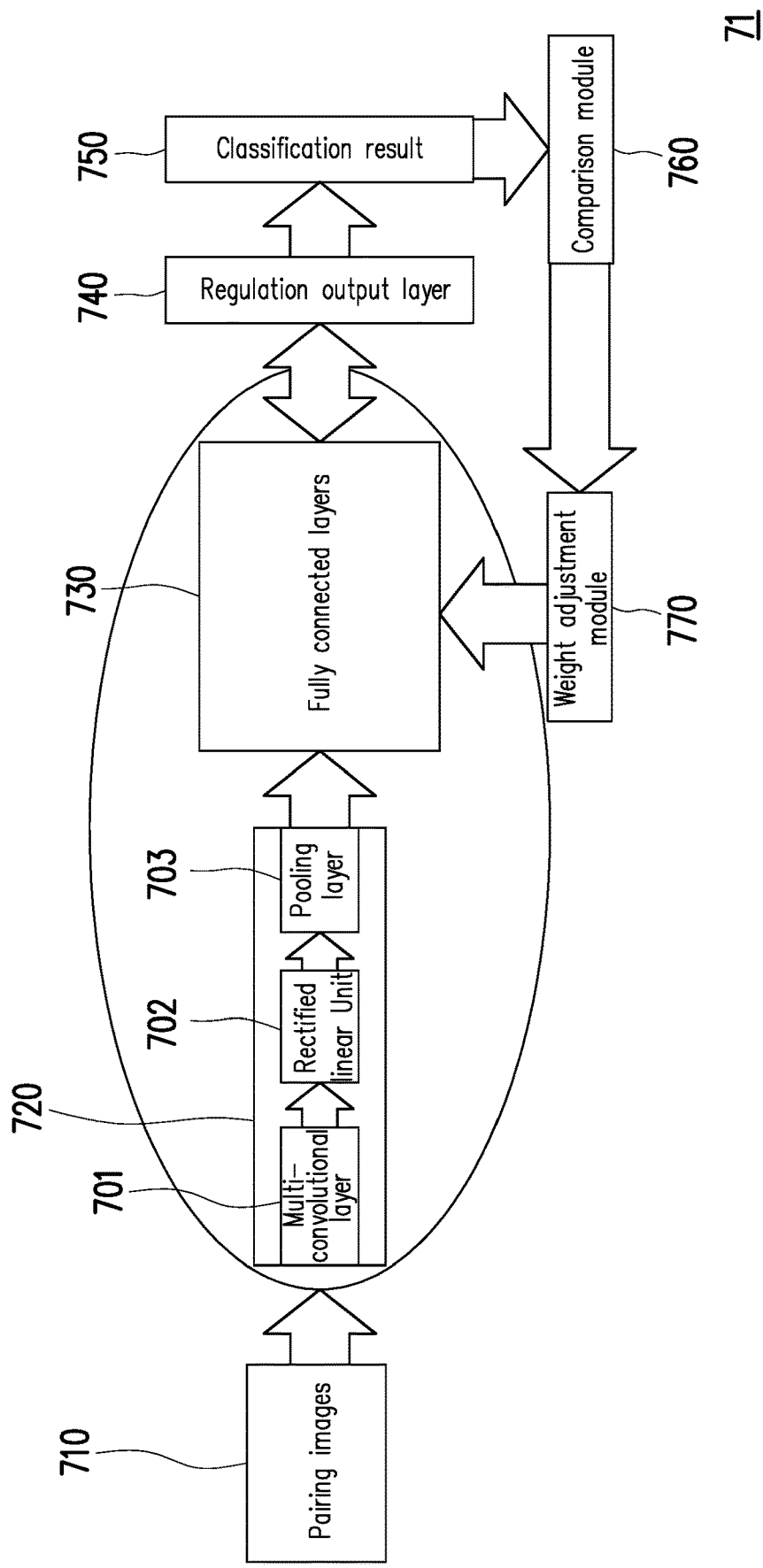
FIG. 7 is a schematic diagram of a neural network architecture according to an embodiment of the disclosure.

FIG. 7 is a schematic diagram of a neural network architecture according to an embodiment of the disclosure. Referring to FIG. 7, a neural network architecture 71 may be a convolutional neural network (CNN) which mainly includes a plurality of feature extractors 720, fully connected layers 730, a regulation output layer 740, a comparison module 760 and a weight adjustment module 770. The feature extractors 720 may include a multi-convolutional layer 701, a rectified linear unit (ReLU) 702 and a pooling layer 703. The fully connected layers 730 may include one or more fully connected layers. Furthermore, the regulation output layer 740 may execute a softmax calculation.

When the neural network architecture 71 is trained, at least one set of pairing images 710 including the defect image and the non-defect image may be input to the neural network architecture 71 and the weights of the fully connected layers 730 may be trained by a back-propagation algorithm. The pairing images 710 corresponds to an input value (e.g., the image data) and a prediction output (e.g., a good product, a not good product, a defective product or a defect type of a defect product). After a feature enhancement and an image compression are performed by the multi-convolutional layer 701, the rectified linear unit 702 and the pooling layer 703, the fully connected layers 730 may classify the input value according to a weight ratio. Then, the regulation output layer 740 may output a classification result 750. The classification result 750 may include a good product, a not good product, a defective product or a defect type of a defect product.

After the classification result 750 is obtained, the comparison module 760 may compare the classification result 750 to a predict output and determine whether the classification result 750 meets a prediction. If the classification result 750 does not meet the prediction, the comparison module 760 output an error value to the weight adjustment module 770. The weight adjustment module 770 calculates and adjusts the weights of the fully connected layers 730 based on the back-propagation algorithm. By repeating the operations above, the neural network architecture 71 may be trained gradually to improve the accuracy rate for inspecting the defect pattern by the neural network architecture 71.

When a defect inspection operation is performed on the second image by the neural network architecture 71, the classification result 750 corresponding to the second image may be generated by the calculations of the feature extractors 720, the fully connected layers 730 and the regulation output layer 740. The classification result 750 may present that an object (e.g., the object 101 of FIG. 1) corresponding to the second image is a good product, a not good product, a defective product and/or a defect type of a defect product.

In an embodiment, the neural network architecture 71 is implemented in the optical inspection device 11 of FIG. 1. For example, the neural network architecture 71 may be combined with the processing circuit 112 of FIG. 2 in a software, firmware or a hardware form. Alternatively, in another embodiment, the neural network architecture 71 may be implemented in a server (also referred to as a server network). The server may perform the automatic inspection of the defect pattern.

Figure 8:
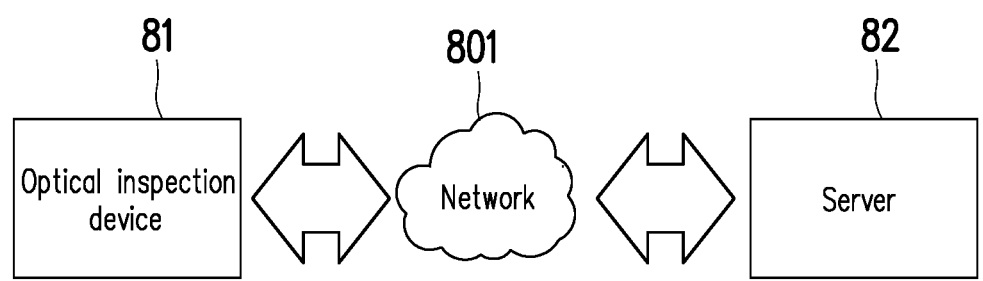
FIG. 8 is a schematic diagram of an optical inspection system according to an embodiment of the disclosure.

FIG. 8 is a schematic diagram of an optical inspection system according to an embodiment of the disclosure. Referring to FIG. 8, the optical inspection system 80 includes an optical inspection device 81 and a server 82. The optical inspection device 81 is connected to the server 82 through a network 801. The network 801 may be a wired network or a wireless network. Furthermore, the network 801 may be a local network or Internet.

In an embodiment, the server 82 includes a CPU, a storage circuit and multiple types of I/O interface circuits, so as to perform the required operations/functions together. Particularly, the server 82 includes a neural network architecture (e.g., the neural network architecture 71 of FIG. 7) which is configured to automatically inspect the defect pattern. The optical inspection device 81 may obtain the first image of an object by an optical lens and perform the edge detection on the first image to obtain the second image having the edge pattern. The optical inspection device 81 may transmit the second image to the server 82 through the network 801. The server 82 may perform the defect inspection operation on the second image based on the trained neural network architecture, so as to detect the defect pattern in the second image.

In an embodiment, the server 82 may automatically generate at least one set of the pairing images based on a sample image and train the neural network architecture according to the pairing images. Alternatively, in an embodiment, the operation of generating the pairing images according to the sample image may be performed by the optical inspection device 81 or other computer device, and the generated pairing images may be provided to the server 82 for training through the network 801. The related operation are mentioned above and not to be repeated hereinafter.

Figure 9:
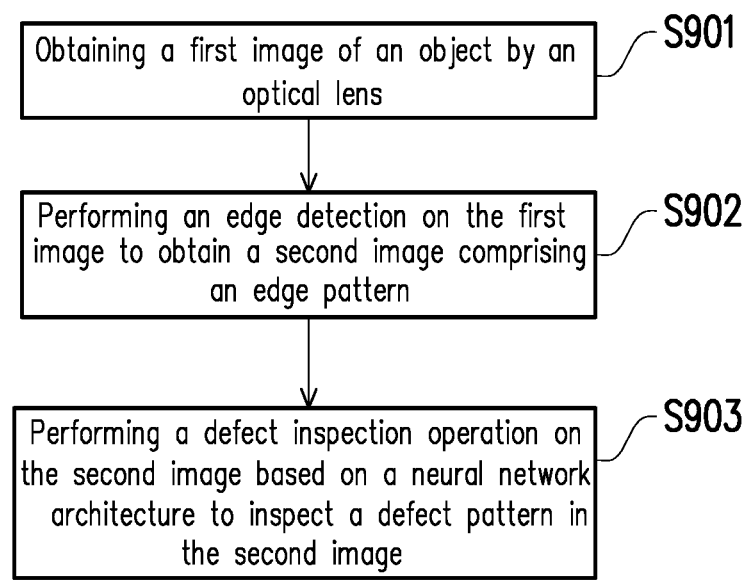
FIG. 9 is a flowchart of an optical inspection method according to an embodiment of the disclosure.

FIG. 9 is a flowchart of an optical inspection method according to an embodiment of the disclosure. Referring to FIG. 9, in step 901, a first image of an object is obtained by an optical lens. In step S902, an edge detection is performed on the first image to obtain a second image including an edge pattern. In step S903, a defect inspection operation is performed on the second image based on a neural network architecture to detect a defect pattern in the second image.

Figure 10:
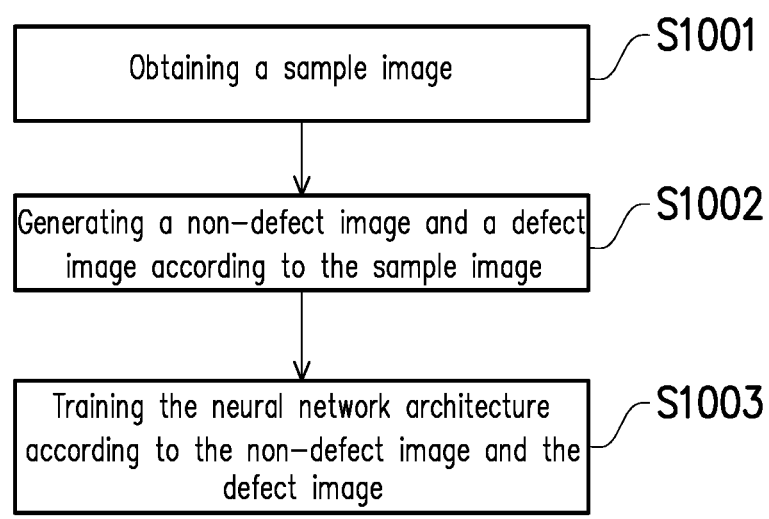
FIG. 10 is a flowchart of an optical inspection method according to an embodiment of the disclosure.

FIG. 10 is a flowchart of an optical inspection method according to an embodiment of the disclosure. Referring to FIG. 10, in step S1001, a sample image is obtained. In step S1002, a non-defect image and a defect image are generated according to the sample image. In step S1003, a neural network architecture is trained according to the non-defect image and the defect image.

Nevertheless, each step of FIG. 9 and FIG. 10 has been described as above and will not repeated hereinafter. It is should be noted that each step illustrated in FIG. 9 and FIG. 10 may be implemented as a plurality of program codes or circuits, which is not limited in the disclosure. Additionally, the methods illustrated in FIG. 9 and FIG. 10 may be implemented together with the embodiments above or may be performed solely, and the disclosure is not limited thereto. In an embodiment of FIG. 1 and FIG. 2, the processing circuit 112 and the storage circuit 113 may be implemented as at least one function module (also referred to as an optical inspection module). The optical inspection module may include a software module, a firmware module and/or a hardware module configured to perform each step of FIG. 9 and/or FIG. 10. Related operation are mentioned above and not to be repeated hereinafter.

On the basis above, the embodiments of the disclosure may improve the inspection accuracy for the inspection of defect pattern by the optical inspection device or the optical inspection system. In an embodiment, since the inspection accuracy for the defect pattern is improved, the inspection result of the optical inspection device or the optical inspection system may not need to be double checked by a human employee, such that the inspection efficiency may be improved. Furthermore, by automatically and randomly generating the pairing images corresponding to the sample image, the efficiency for training the neural network architecture may be improved. For example, comparing to training a neural network architecture by generating the training samples having defects in a manual may (i.e., by a human employee), the operations of automatically generating the pairing images and training the neural network architecture based on the embodiments of the disclosure may significantly reduce the training time for training the neural network architecture and reduce the human resource cost.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A defect inspection method for an optical inspection device with an optical lens, wherein the defect inspection method comprises:
   obtaining a sample image;
   generating a first non-defect image according to the sample image and adding a first defect pattern into a first image region randomly, so as to generate a first defect image according to the sample image,
   wherein the first defect image comprises the first defect pattern, the first non-defect image does not comprise the first defect pattern, and the first non-defect image and the first defect image both correspond to the first image region of the sample image;
   training a neural network architecture according to the first non-defect image and the first defect image;
   obtaining a first image of an object by the optical lens;
   performing an edge detection on the first image to obtain a second image with an edge pattern; and
   performing a defect inspection operation on the second image with the edge pattern based on the trained neural network architecture to inspect a defect pattern in the second image.

2. The defect inspection method according to claim 1, wherein the step of performing the edge detection on the first image to obtain the second image comprising the edge pattern comprises:
   performing the edge detection on the first image based on at least one of a red model, a green model and a blue model of a RGB color model, so as to obtain the second image comprising the edge pattern.

3. The defect inspection method according to claim 1, wherein the step of generating the first non-defect image according to the sample image and adding the first defect pattern into the first image region randomly, so as to generate the first defect image according to the sample image comprises:
   performing at least one of a chromaticity adjustment operation, a brightness adjustment operation and a pattern scaling operation, so as to generate the first non-defect image and the first defect image.

4. The defect inspection method according to claim 1, wherein the step of adding the first defect pattern into the first image region randomly comprises:
   selecting at least one first pixel in the first image region;
   selecting at least one second pixel neighboring to at least one of the at least one first pixel in the first image region; and
   generating the first defect pattern according to the at least one first pixel and the at least one second pixel.

5. A defect inspection device, comprising:
   an optical lens, configured to obtain a first image of an object; and
   a processing circuit, coupled to the optical lens and configured to:
      obtain a sample image,
      generate a first non-defect image according to the sample image and add a first defect pattern into a first image region randomly, so as to generate a first defect image according to the sample image,
      wherein the first defect image comprises the first defect pattern, the first non-defect image does not comprise the first defect pattern, and the first non-defect image and the first defect image both correspond to the first image region of the sample image,
      train a neural network architecture according to the first non-defect image and the first defect image, perform an edge detection on the first image to obtain a second image comprising an edge pattern,
perform a defect inspection operation on the second image with the edge pattern based on the trained neural network architecture to inspect a defect pattern in the second image.

6. The defect inspection device according to claim 5, wherein the operation of performing the edge detection on the first image to obtain the second image comprising the edge pattern comprises:
performing the edge detection on the first image based on at least one of a red model, a green model and a blue model of a RGB color model, so as to obtain the second image comprising the edge pattern.

7. The defect inspection device according to claim 5, wherein the operation of generating the first non-defect image according to the sample image and adding the first defect pattern into the first image region randomly, so as to generate the first defect image according to the sample image comprises:
performing at least one of a chromaticity adjustment operation, a brightness adjustment operation and a pattern scaling operation, so as to generate the first non-defect image and the first defect image.

8. The defect inspection device according to claim 5, wherein the operation of adding the first defect pattern into the first image region randomly comprises:
selecting at least one first pixel in the first image region;
selecting at least one second pixel neighboring to at least one of the at least one first pixel in the first image region; and
generating the first defect pattern according to the at least one first pixel and the at least one second pixel.

9. A defect inspection system, comprising:
an optical inspection device, configured to obtain a first image of an object and perform an edge detection on the first image to obtain a second image with an edge pattern; and
a server, coupled to the optical inspection device and configured to:
obtain a sample image,
generate a first non-defect image according to the sample image and add a first defect pattern into a first image region randomly, so as to generate a first defect image according to the sample image,
wherein the first defect image comprises the first defect pattern, the first non-defect image does not comprise the first defect pattern, and the first non-defect image and the first defect image both correspond to the first image region of the sample image,
train a neural network architecture according to the first non-defect image and the first defect image, and
perform a defect inspection operation on the second image with the edge pattern based on the trained neural network architecture to inspect a defect pattern in the second image.

10. The defect inspection system according to claim 9, wherein the operation of performing the edge detection on the first image to obtain the second image comprising the edge pattern comprises:
performing the edge detection on the first image based on at least one of a red model, a green model and a blue model of a RGB color model, so as to obtain the second image comprising the edge pattern.

11. The defect inspection system according to claim 9, wherein the operation of generating the first non-defect image according to the sample image and adding the first defect pattern into the first image region randomly, so as to generate the first defect image according to the sample image comprises:
performing at least one of a chromaticity adjustment operation, a brightness adjustment operation and a pattern scaling operation, so as to generate the first non-defect image and the first defect image.

12. The defect inspection system according to claim 9, wherein the operation of adding the first defect pattern into the first image region randomly comprises:
selecting at least one first pixel in the first image region;
selecting at least one second pixel neighboring to at least one of the at least one first pixel in the first image region; and
generating the first defect pattern according to the at least one first pixel and the at least one second pixel.

* * * * *